United States Patent [19]
Herzig et al.

[11] Patent Number: 5,525,696
[45] Date of Patent: Jun. 11, 1996

[54] CROSSLINKABLE COMPOSITIONS AND THEIR USE FOR THE PRODUCTION OF NON-STICK COATINGS

[75] Inventors: Christian Herzig, Taching am See; Bernward Deubzer, Burghausen; Inge Seeger-Feichtinger, Stubenberg, all of Germany

[73] Assignee: Wacker-Chemie GmbH, Munich, Germany

[21] Appl. No.: 327,739

[22] Filed: Oct. 24, 1994

[30] Foreign Application Priority Data

Oct. 27, 1993 [DE] Germany .................. 43 36 703.8

[51] Int. Cl.⁶ .................................................. C08G 77/08
[52] U.S. Cl. .................. 528/15; 525/478; 528/12; 528/18; 528/20; 528/21
[58] Field of Search .................. 528/15, 13, 20, 528/21, 18; 525/478

[56] References Cited

U.S. PATENT DOCUMENTS

| | | |
|---|---|---|
| 3,159,662 | 12/1964 | Ashby ........................ 525/478 |
| 4,609,574 | 9/1986 | Keryk et al. . |
| 5,145,932 | 9/1992 | Sasaki et al. . |
| 5,241,034 | 8/1993 | Herzig et al. . |
| 5,290,885 | 3/1994 | Vincent et al. ............. 525/478 |

FOREIGN PATENT DOCUMENTS

| | | |
|---|---|---|
| 0444960 | 9/1991 | European Pat. Off. . |
| 0446030 | 9/1991 | European Pat. Off. . |
| 0523660 | 1/1993 | European Pat. Off. . |
| 0605227 | 7/1994 | European Pat. Off. . |

OTHER PUBLICATIONS

Journal of Applied Polymer Science, vol. 47, 2257–2267 (1993), "Network Structure and Properties of Platinum--Catalyzed Addition Cure Release Coatings" by J. Stein et al.

Primary Examiner—Melvyn I. Marquis
Attorney, Agent, or Firm—Martin Connaughton

[57] ABSTRACT

Compositions which comprise
- (A) a polymeric organosilicon compound having 1 to 6 Si-bonded hydrogen atoms per molecule,
- (B) a polymeric organosilicon compound having at least two alkenyl groups per molecule and a viscosity of not more than 100 mm²/s,
- (C) a polymeric organosilicon compound having on average at least 10 Si-bonded hydrogen atoms per molecule,
- (D) a catalyst and, optionally
- (E) an inhibitor, with the proviso that the molar ratio of all the Si-bonded hydrogen atoms to all the SiC-bonded alkenyl groups in the composition is on average less than 1, the composition comprises (B) in an amount such that the composition comprises on average at least 1.1 alkenyl radicals of (B) per Si-bonded hydrogen atom of (A)

and the content of Si-bonded hydrogen atoms of (C) is 5% to 50%, based on the number of all the Si-bonded hydrogen atoms present.

10 Claims, No Drawings

CROSSLINKABLE COMPOSITIONS AND THEIR USE FOR THE PRODUCTION OF NON-STICK COATINGS

FIELD OF THE INVENTION

The present invention relates to crosslinkable compositions comprising a polymeric organosilicon compound which contains alkenyl groups, polymeric organosilicon compounds which contain Si-bonded hydrogen atoms and a catalyst, and to their use for the production of non-stick coatings.

The term "polymeric organosilicon compounds" in the context of this invention is to be understood as meaning both polymeric and oligomeric organosilicon compounds. Likewise, the term "organopolysiloxanes" is intended also to include oligomeric siloxanes.

BACKGROUND OF INVENTION

U.S. Pat. No. 4,609,574 (issued on Sept. 2, 1986, Dow Corning Corp.) discloses crosslinkable compositions which are used for the production of non-stick coatings and which comprise an alkenyl-functional organopolysiloxane in which a maximum of 10% of all the organic radicals are alkenyl groups and a methylhydridopolysiloxane having at least 3 Si-bonded hydrogen atoms per molecule, the ratio of Si-bonded hydrogen atoms to the alkenyl groups being 0.8 to 1.5. EP 523 660 A1 (published on Jan. 20, 1993, Wacker-Chemie GmbH) and the corresponding U.S. Pat. No. 5,241,034 describe compositions of alkenyl organosilicon compounds, hydridosiloxane cross-linking agents, catalyst and, optionally, initiator, the ratio of Si-bonded hydrogen to alkenyl groups preferably being 1 to 3. U.S. Pat. No. 5,145,932 (issued on Sept. 8, 1992, Toray Silicon Co., Ltd.) discloses formulations which comprise an alkenylorganopolysiloxane having at least two alkenyl groups per molecule, hydridoorganosiloxane crosslinking agents having at least two SiH groups, catalyst and inhibitor, and organopolysiloxanes which comprise neither Si-bonded hydrogen nor alkenyl groups. EP 444 960 A2 (published on Sept. 4, 1991, Shin-Etsu Chemical Co., Ltd.) describes addition-crosslinking organopolysiloxane compositions which comprise an organopolysiloxane containing vinyl groups and having Si-bonded hydrogen atoms, an organohydridosiloxane and a catalyst. In the J. of Applied Polymer Sci. 47, 2257 (1993) Stein et al., compositions of vinylsiloxane, hydridosiloxane, platinum catalyst and inhibitor are investigated for the nature of the network obtained after curing, it being pointed out that, although an excess of SiH is necessary to increase the rate of curing, on the other hand this has an interfering effect in the network and changes the physical properties of the coating by post-curing effect.

SUMMARY OF INVENTION

The present invention relates to compositions consisting of (A) a polymeric organosilicon compound having 1 to 6 Si-bonded hydrogen atoms per molecule, these Si-bonded hydrogen atoms being present in a proportion of 0.001% to 0.100% by weight, based on the total weight of the organosilicon compound (A), (B) a polymeric organosilicon compound having at least two groups $R^2$ per molecule of the formula

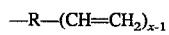

where R is a divalent, trivalent or tetravalent hydrocarbon radical having 1 to 12 carbon atoms, which can optionally be interrupted by 1 to 4 oxygen atoms, and x is 2, 3 or 4, the viscosity of the organosilicon compound (B) at 25° C. being not more than 200 mm$^2$/s, (C) a polymeric organosilicon compound having on average at least 10 Si-bonded hydrogen atoms per molecule, these Si-bonded hydrogen atoms being present in a proportion of 0.4% to 1.7% by weight, based on the total weight of the organosilicon compound (C), (D) a catalyst which promotes the addition of Si-bonded hydrogen onto an aliphatic double bond and, optionally, (E) an inhibitor, with the proviso that the molar ratio of all the Si-bonded hydrogen atoms to all the alkenyl groups —CH=CH$_2$ in the composition is on average less than 1, preferably less 0.9, the composition contains an organosilicon compound (B) in an amount such that the composition contains, per Si-bonded hydrogen atom of component (A) on average at least 1.1, more preferably at least 1.3, alkenyl radicals —CH=CH$_2$ of component (B)

and the content of Si-bonded hydrogen atoms of the organosilicon compound (C) is 5% to 50%, based on the number of all the Si-bonded hydrogen atoms present in the composition. The organosilicon compounds (A) employed preferably contain on average 1.5 to 3.0 Si-bonded hydrogen atoms per molecule.

The organosilicon compounds (A) employed preferably have a viscosity at 25° C. of 10 to 200,000 mm$^2$/s, more preferably 50 to 10,000 mm$^2$/s, in particular 100 to 1,000 mm$^2$/s.

The organosilicon compounds (A) employed are preferably those of units of the formula

in which $R^1$ are independently SiC-bonded, optionally halogenated hydrocarbon radicals having 1 to 18 carbon atoms, e is 0 or 1, on average 0.001 to 0.1, f is 0, 1, 2 or 3, on average 1.0 to 2.0, and the sum of e+f is not greater than 3, with the proviso that the organosilicon compound (A) 1 to 6 Si-bonded hydrogen atoms which are present in a proportion of 0.001% to 0.100% by weight, based on the total weight of the organosilicon compound (A).

Although not expressed by formula (I) also not preferred, organosilicon compounds in which the siloxane oxygen between two silicon atoms is replaced completely or partly divalent hydrocarbon radicals having 2 to 20 carbon atoms, which can be interrupted by one or more oxygen atoms, or in which the siloxane oxygen is completely or partly absent, oligo- or polysilane structures being formed, can also be employed as component (A).

Examples of radical $R^1$ are alkul radicals, such as the methyl, ethyl, n-propyl, iso-propyl, 1-n-butyl, 2-n-butyl, isobutyl, tert-butyl, n-pentyl, iso-pentyl, neo-pentyl, tert-pentyl radical; hexyl radicals, such as the n-hexyl radical; heptyl radicals, such as the n-neptyl radical; cetyl radicals, such as the n-octyl radical and iso-octyl radicals, such as the 2,2,4-trimethyipentyl radical; nonyl radicals, such as the n-nonyl radical, decyl radicals, such as the n-decyl radical; dodecyl radicals, such as the n-dodecyl radical; octadecyl radicals, such as the n-octadecyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals, xylyl radicals and ethylphenyl radicals, and aralkyl radicals, such as the benzyl radical and the α and the β-phenyl-ethyl radical.

Examples of halogensted radicals $R^1$ are haloalkyl radicals, such as the 3,3,3trifluoro-n-propyl radical, the 2,2,2,2', 2',2-hexafluoroisopropyl radical and the heptafluoroisopropyl radical, and haloaryl radicals, such as the o-, m- and p-chlorophenyl radical.

The radical $R^1$ is preferably alkyl radicals having 1 to 4 carbon atoms, in particular the methyl radical.

The organosilicon compounds (A) of units of formula (I) are preferably organopolysiloxanes of the formula $$H_2R^1_{3-d}SiO(SiR^1_2O)_o(SiHR^1O)_pSiR^1_{3-d}H_d \qquad (II),$$

in which $R^1$ has the meaning given above, d is 0 or 1, o is an integer from 10 to 1000 and p is 0 or an integer from 1 to 6, with the proviso that the organosilicon compound (A) contains 1 to 6 Si-bonded hydrogen atoms per molecule which are present in a proportion of 0.001% to 0.100% by weight, based on the total weight of the organosilicon compound (A).

In the context of this invention, the o units —(SIR$^1_2$O)— and p units —(SiHR$^1$O)— in formula (III) can be distributed in the organo-siloxane molecule in any desired manner.

The organosilicon compound (A) employed preferably consists of copolymers of dimethylhydridosiloxane and dimethylsiloxane units, copolymers of dimethylsiloxane, dimethylhydridosiloxane and trimethylsiloxane units, copolymers of dimethylhydridosiloxane, dimethylsiloxane and methylhydridosiloxane units, copolymers of trimethylsiloxane and methylhydridosiloxane units and copolymers of trimethylsiloxane, dimethylsiloxane and methylhydridosiloxane units, in particular copolymers of dimethylhydridosiloxane and dimethylsiloxane units and copolymers of dimethylhydridosiloxane, trimethylsiloxane and dimethylsiloxane units.

The organosilicon compound (A) employed can be one type or at least two different types of such organosilicon compounds. In general, the organosilicon compounds (A) are mixtures, as a result of preparation, such as, mixtures of organopolysiloxanes having two Si-bonded hydrogen atoms and organopolysiloxanes having only one Si-bonded hydrogen atom.

The polymeric organosilicon compounds (A) employed are commercially obtainable or can be prepared by processes known in silicon chemistry.

The organosilicon compounds (B) employed preferably contain at least 3 alkenyl groups —CH=CH$_2$.

The content of groups $R^2$ of the formula —R—(CH=CH$_2$)$_{x-1}$, where R and x have the above mentioned meaning, in the organosilicon compound (B) is preferably more than 10%, more preferably between 10% and 50%, based on the number of all the SiC-bonded radicals.

The organosilicon compound (B) employed preferably has a viscosity of not more than 100 mm$^2$/s at 25° C., in particular not more than 25 mm$^2$/s.

The organosilicon compound (B) employed are preferably organosilicon compounds according to E? 523 660 A1 cited above, and those of units of the formula $$R^2_aR^3_{3-a}SiO_{1/2} \qquad (III)$$

and $$R^2_bR^3_{2-b}SiO_{2/2} \qquad (IV),$$

in which $R^2$ is independently SiC-bonded radicals of the formula —R—(CH=CH$_2$)$_{x-1}$ where R and x has the above mentioned meaning, $R^3$ is aliphatically saturated, optionally substituted SiC-bonded hydrocarbon radicals having 1 to 6 carbon atoms, a is 0, 1, 2 or 3, preferably 0 or 1, and b is 0, 1 or 2, preferably 1, with the proviso that these compounds contain at least two radicals $R^2$ per molecule and the organosilicon compounds have a viscosity at 25° C. of not more than 200 mm$^2$/s.

The organosilicon compound (B) employed can furthermore be cyclic produces, preference being given to reaction products of (HCH$_3$SiO)$_3$ and/or (HCH$_3$SiO)$_4$ with α,ω-dienes, such as

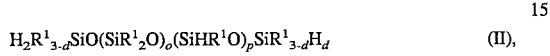

where Hex is the 5-hexenyl radical.

The organosilicon compound (B) is preferably chosen such that with the amount of (B) to be employed, based on (A), miscibility exists between these two components.

Examples of radicals R are divalent hydrocarbon radicals having 1 to 12 carbon atoms, such as the methylene, 1,4-butylene, 1,6-hexylene, 1,8-octylene and the 1,12-dodecylene radicals, trivalent hydrocarbon radicals having 1 to 12 carbon atoms, such as

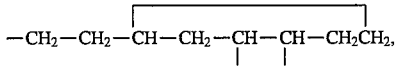

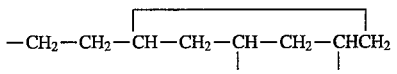

and

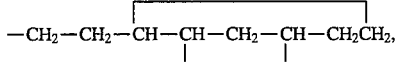

as well as tetravalent hydrocarbon radicals having 1 to 12 carbon atoms, such as

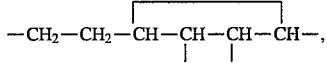

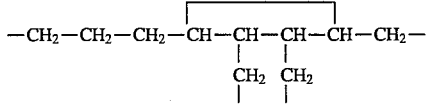

and

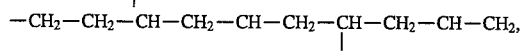

preference being given to divalent and trivalent hydrocarbon radicals having 1 to 12 carbon atoms.

The radical $R^2$ is preferably radicals of the formula —R—CH=CH$_2$, where R is the divalent hydrocarbon radical mentioned above, such as, the allyl, 5-hexenyl, 7-octenyl, 9-decenyl and the 13-tetradecenyl radical, as well as radicals of the formula —R—(CH=CH$_2$)$_2$, where R is the trivalent hydrocarbon radical mentioned above, such as the 2-(3,4-divinylcyclohexyl)ethyl, the 2-(3,5-divinylcyclohexyl)ethyl or the 2-(2,4-divinylcyclohexyl)ethyl radicals, particular preference is given to radicals of the formula —R—CH=CH$_2$, where R is the divalent hydrocarbon radical mentioned above, in particular the 5-hexenyl radical.

Examples of the radical $R^3$ are the methyl, ethyl, propyl, butyl and the hexyl radical, the methyl radical being preferred.

Examples of the organosilicon compounds (B) employed are copolymers of trimethylsiloxane and 5-hexenylmethylsiloxane units, copolymers of trimethylsiloxane, dimethylsiloxane and 5-hexenylmethylsiloxane units, copolymers of 5-hexenyldimethylsiloxane and 5-hexenylmethylsiloxane units, copolymers of trimethylsiloxane and allylmethylsiloxane units, copolymers of trimethylsiloxane and 9-decenylmethylsiloxane units and copolymers of trimethylsiloxane, 5-hexenylmethylsiloxane and 1,6-(methylsiloxanyl)hexane units as well as products prepared by hydrosilylation from 1,1,3,3-tetramethyldisiloxane and 1,2,4-trivinylcyclohexane and/or 1,3,5-trivinylcyclohexane.

The organosilicon compounds (B) employed are particularly preferably 5-hexenyloligosiloxanes with a viscosity of 10 to 25 mm$^2$/s at 25° C., which consists of 5-hexenylmethylsiloxane and trimethylsiloxane units, as well as copolymers of oligosiloxanes and hydrocarbon blocks according to EP 523 660 A1 cited above, at least one hydrocarbon block joining at least two siloxane blocks, with the proviso that all the organosilicon compounds mentioned contain at least two radicals $R^2$ per molecu , the number of radicals $R^2$ in the organosilicon compound being more than 10% of all SiC-bonded radicals, and the organosilicon compounds having a viscosity of 25° C. of not more than 200 mm$^2$/s.

The compositions consists of component (B) in amounts of preferably 1 to 25 parts by weight per 100 parts by weight of organosilicon compound (A) employed.

The polymeric organosilicon compounds (B) employed are commercially obtainable or can be prepared by processes known in silicon chemistry.

The organopolysiloxanes (C) employed preferably contain on average at least 20 Si-bonded hydrogen atoms per molecule, more preferably 20 to 40 Si-bonded hydrogen atoms.

The content of Si-bonded hydrogen atoms in the organosilicon compound (C) is preferably 1.0% to 1.7% by weight, based on the total weight of the organosilicon compound (C).

The organosilicon compounds (C) employed preferably have a viscosity at 25° C. of 5 to 100 mm$^2$/s, more preferably 15 to 30 mm$^2$/s.

The organosilicon compound (C) employed is preferably one of the units of the formula

in which $R^4$ is identical or different and has one of the meanings given for $R^1$, g is 0 or 1, on average 0.2 to 1.0, h is 0, 1, 2 or 3, on average 1.0 to 1.8, and the sum g+h is not greater than 3, with the proviso that the organosilicon compound (C) contains at least 10 Si-bonded hydrogen atoms which are present in a proportion of 0.4% to 1.7% by weight, based on the total weight of the organosilicon compound (C).

Although not expressed by formula (V) and also not preferred in most cases, organosilicon compounds in which the siloxane oxygen between two silicon atoms is replaced completely or partly by divalent hydrocarbon radicals having 2 to 20 carbon atoms, which can be interrupted by one or more oxygen atoms, or in which the siloxane oxygen is completely or partly absent, oligo- or polysilane structures being formed, can also be employed as component (C).

Examples of radicals $R^4$ are the examples given for the radical $R^1$.

The radical $R^4$ is preferably the methyl radical.

The organosilicon compounds (C) of formula (V) are preferably organopolysiloxanes of the formula

in which $R^4$ has the meaning given above, i is 0 or 1, k is 0 or an integer from 1 to 50 and l is an integer from 10 to 60, the sum of k+l being not greater than 70.

In the context of this invention, in formula (VI), the k units —(SIR420)— and l units —(SiHR$^4$O)— can be distributed in the organosiloxane molecule in any desired manner.

The organosilicon compound (C) employed preferably comprises copolymers of dimethylhydridosiloxane, dimethylsiloxane and methylhydridosiloxane units, copolymers of trimethylsiloxane and methylhydridosiloxane units and copolymers of trimethylsiloxane, dimethylsiloxane and methylhydridosiloxane units, in particular copolymers of trimethylsiloxane and methylhydridosiloxane units.

The organosilicon compound (C) employed can be one type or at least two different types of such organosilicon compounds.

The polymeric organosilicon compounds (C) employed are commercially obtainable or can be prepared by processes known in silicon chemistry.

The compositions consist of organosilicon compound (C) in amounts of preferably 0.05 to 5 parts by weight per 100 parts by weight of organosilicon compound (A) employed.

Catalysts (D) which promote the addition of Si-Bonded hydrogen at an aliphatic double bond can me the same catalysts previously employed for promoting the addition of Si-bonded hydrogen onto an aliphatic double bond. The catalysts (D) are preferably a metal from the group of platinum metals or a compound or a complex from the group of platinum metals.

Examples of catalysts (D) are metallic and finely divided platinum, which can be on supports such as silicon dioxide, aluminum oxide or active charcoal, and compounds or complexes of platinum, such as platinum halides, PtCl$_4$, H$_2$PtCl$_6$·6H$_2$O, Na$_2$PtCl$_4$·4H$_2$O, platinum-olefin complexes, platinum-alcohol complexes, platinum-alconolate complexes. platinum-ether complexes, platinum-aldehyde complexes, platinum-ketone complexes, including reaction products of H$_2$PtCl$_6$·6H$_2$O and cyclohexanone, platinumvinyisiloxane complexes, such as platinum-1,3-divinyl-1,1,3,3-tetramethyldisiloxane complexes with or without a detectable content of inorganically bonded halogen, bis(✓-picoline)platinum, dichloride, trimethylenedipyridineDiazinun dichloride, dicyclopentadieneplatinum dichloride, dimethel sulfoxideethyleneplatinum(II) dichloride, cyclooctadiene-platinum dichloride, norboradiene-platinum dichloride, ✓-picoline)platinum dichloride, cyclopentadiene-platinum dichloride and reaction products of platinumtetrachloride with olefin and primary amine or secondary amine or primary and secondary amine according to U.S. Pat. No. 4,292,434, such as the reaction product of platinum tetrachloride, dissolved in 1-octene, with sec-butylamine, or ammonium-platinum complexes according to EP-B 110 370.

The catalyst (D) is preferably employed in amounts of 5 to 500 ppm by weight (parts by weight per million parts by weight), in particular 10 to 200 ppm by weight, calculated as elemental platinum metal and based on the total weight of the mixture of (A), (B) and (C).

In addition to constituents (A), (B), (C) and (D), the compositions can also consist of agents which delay addition of Si-bonded hydrogen at an aliphatic double bond at room temperature, so-called inhibitors (E).

An addition of inhibitor (E) is particularly advantageous to achieve pot lives of about 0.1 to 100 hours.

Inhibitors (E) which can be used in the composition are all the inhibitors which previously have been used for the same purpose. Examples of inhibitors (E) are 1,3-divinyl-1,1,3,3-tetramethyldisiloxane, benzotriazole, dialkylformamide, alkylthioureas, methyl ethyl ketoxime, organic or organosilicon compounds having a boiling point of at least 25° C. under 1012 mbar (absolute) and at least one aliphatic triple bond according to U.S. Pat. No. 3,445,420, such as 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, inhibitors according to U.S. Pat. No. 2,476,166, such as a mixture of diallyl maleate and vinyl acetate, inhibitors according to U.S. Pat. No. 4,504,645, such as maleic acid monoesters, inhibitors according to U.S. Pat. No. 4,670,531, such as azodicarboxylic acid esters, inhibitors according to EP 186 439, such as dialkyl maleates, inhibitors according to U.S. Pat. No. 5,082,871, such as dialkyl acetylenedicarboxylates, and inhibitors according to U.S. Pat. No. 4,562,096, such as maleates and fumarates.

If inhibitors (E) are employed in the compositions, the amounts are 0.2 to 5.0 parts by weight per 1000 parts by weight of a mixture of (A), (B) and (C).

The compositions furthermore can consist of additives, such as foam suppressants, thickeners, flow improvers, adhesion promoters and solvents.

Although the sequence of mixing of constituents (A), (B), (C), (D) and optionally (E) is not decisive, it has proved appropriate in practice to add catalyst (D) last to the mixture of the other constituents.

The compositions can advantageously be prepared by the working procedures described below:

(a) the individual constituents can be mixed in the sequence (A)+(C)+optionally (E)+(B)+(D), (b) if inhibitor (E) is employed, this can be premixed with constituents (A) or (C) and the remaining constituents can then be added in the sequence shown under (A), (c) constituents (A), (C) and optionally (E) are premixed and the remaining constituents are then added in the sequence shown under (a), (d) constituents (A), (C) and optionally (E) are premixed and a mixture of constituents (B) and (D) is then added shortly before use, and (e) if inhibitor (E) is employed, this can be mixed with constituents (B) and (D) and the mixture can then be added to the mixture of constituents (A) and (C).

The compositions are suitable, for example, for the production of release, covering and interleaving paper, including interleaving paper which is employed in the production of case or decorative films or of foams, including those of polyurethane. The compositions furthermore are suitable, for example, for the production of release, covering and interleaving pasteboard, films and cloths for finishing the reverse sides of self-adhesive tapes or self-adhesive films or of the written sides of self-adhesive labels. The compositions are also suitable for finishing packaging materials, such as those made of paper, cardboard boxes, metal foils and drums, for example pasteboard, plastic, wood or iron, which is/are intended for storage and/or transportation of sticky goods, such as adhesives, sticky foodstuffs, for example cakes, honey, sweets and meat, bitumen, asphalt, greased materials and crude rubber. Another example of the use of the compositions is the finishing of carriers for transfer of pressure-sensitive adhesive layers in the so-called transfer process.

The compositions are suitable for the production of the self-adhesive materials joined with the release paper either by the off-line process or by the in-line process.

The application of the compositions to the surfaces to be rendered non-stick can be carried out in any desired and in many cases known manner suitable for the production of coatings from liquid substances, for example by dipping, brushing, pouring, spraying, rolling on, printing, for example by means of an offset gravure coating device, knife or doctor blade coating or by means of an air brush.

The surfaces which are to be rendered non-stick and can be treated in the context of the invention can be surfaces of any desired substances which are solid at room temperature under 900 to 1100 hPa. Examples of such surfaces are those of paper, wood, cork and films plastic, for example p yetnylene films or polypropylene films, woven and nonwoven cloth of naturally occurring or synthetic fibers or glass fibers, ceramic objects, glass, metals, polyethylene-coated paper and pasteboard, including pasteboard made from asbestos. The above mentioned polyethylene can be high, medium or low pressure polyethylene. The paper can be inferior grades of paper, such as absorbent paper, including base kraft paper, that is kraft paper which has not been pretreated with chemicals and/or polymeric naturally occurring substances, having a weight of 60 to 150 g/m$^2$, unsized paper, paper of low freeness value, paper containing wood, non-satinized or non-calendered paper, paper which, by the use of a dry glazing cylinder during its production and without further involved measures, is smooth on one side and is therefore called "paper machine-smoothed on one side", non-coated paper or paper produced from waste paper, or so-called recycled paper. The paper to be treated can of course, also be high-quality grades of paper, such as low-absorbent paper, sized paper, paper having a high freeness value, wood-free paper, calendered or satinized paper, glassine paper, parchmentized paper or precoated paper. The pasteboard can also be of high or inferior quality.

The crosslinking of the compositions is preferably carried out at 50° C. to 150° C., more preferably 60° C. to 100° C., under a pressure of 900 to 1100 hPa.

Sources of energy which are used for crosslinking by heating are preferably ovens, for example circulating air drying cabinets, heating tunnels, heated rolls, heated plates or heat rays in the infrared range.

The compositions have the advantage that rapid crosslinking is already achieved at low temperatures. The compositions furthermore have the advantage that highly abrasion-resistant, adhesive coatings are obtained.

The compositions can also be allowed to crosslink by irradiation with ultraviolet light or by irradiation with UV and IR light, as well as by heating. The ultraviolet light used is usually that having a wavelength of 253.7 nm. A wide range of lamps which emit ultraviolet light having a wavelength of 200 to 400 nm, and which preferably emit ultraviolet light having a wavelength of 253.7 nm, are commercially available.

The compositions according to the invention have the advantage that, as a result of the ratio of Si-bonded hydrogen atoms to alkenyl groups —CH=CH$_2$ being less than 1, uncontrolled postcurings which are caused by reaction of residual SiH are prevented.

The compositions have the advantage that surprisingly long pot lives are already achieved by addition of extremely small amounts of inhibitor (E). It has been found to be very advantageous that, for example, a composition formulated to a pot life of several days cures surprisingly quickly.

It is furthermore advantageous that even with acrylic adhesives, low and stable release values can be achieved in the production of adhesive labels using the compositions according to the invention.

In the examples described below, all the parts and percentages data relate to the weight, unless stated otherwise. Unless stated otherwise, the examples below are carried out under a pressure of the surrounding atmosphere under about 1000 hPa, and at room temperature at about 23° C., or at a temperature which is established when the reactants are brought together at room temperature without additional heating or cooling.

All viscosity data below are based on a temperature of 25° C.

EXAMPLE 1

(I) Preparation of alkenylsiloxane (B)

A short-chain equilibrate of trimethylsiloxy and hydridomethylsiloxy units having a viscosity of 2 mm$^2$/s is subjected to vacuum distillation to remove long-chain constituents and Si$_2$ and Si$_3$ fractions. The cut of about 60° C. to 160° C. under 3 hPa is collected separately. The resulting siloxane mixture (H-siloxane) has a viscosity of 1.4 mm$^2$/s at 25° C. and contains 9.0 g of Si-bonded hydrogen per kg, and corresponds on average to the average formula (CH$_3$)$_3$SiO—(HCH$_3$SiO)3.14—Si(CH$_3$)$_3$.

Various amounts of the siloxane mixture thus obtained are reacted with various amounts of 1,5-hexadiene in the presence of the platinum catalyst described under (II), The particular amounts employed and data on the products (B1) to (B3) obtained can be seen in Table 1.

TABLE 1

|  | B1 | B2 | B3 |
| --- | --- | --- | --- |
| H-siloxane [g] | 44.6 | 111.6 | 111.6 |
| Hexadiene [g] | 410.0 | 143.5 | 104.6 |
| Siloxane (B) [g] | 76.4 | 182.4 | 179.9 |
| Viscosity [mm$^2$/s] | 11.3 | 18.5 | 29.6 |

TABLE 1-continued

|  | B1 | B2 | B3 |
| --- | --- | --- | --- |
| meq C=C/100 g | 472 | 426 | 380 |
| C=C/SiCH* | 0.88 | 0.78 | 0.68 |

*from the $^1$H-NMR spectrum "meq" means milliequivalent; or mmol of —C=C— per 100 g of compound (B).

About 1 mg of platinum per 100 g in the form of the catalyst described under (II) is added to hexadiene and the mixture is heated at about 50° C. under a nitrogen atmosphere. The H-siloxane described above is added and the mixture is allowed to react at reflux temperature for 3 hours. Excess hexadiene is distilled off at 80° C. and the particular alkenylsiloxane obtained is freed from volatile constituents in vacuo under 3 hPa. The ratio of monohydrosilylation to dihydrosilylation on the 1,5-hexadiene C=C/SiCH is calculated from the data of the $^1$H-NMR spectrum and shown in Table 1. The alkenylsiloxanes (B1) to (B3) thus obtained dissolve to give clear solutions in α,w-dihydridopolydimethylsiloxane with a viscosity of 240 mm$^2$/s.

(II) Platinum catalyst 1,3-divinyl-1,1,3,3-tetramethyldisiloxane complex of platinum according to U.S. Pat. No. 3,775,452 diluted in α-ω-divinyldimethylsilicone oil of viscosity 1000 mm$^2$/s to a Pt content of 1.0% by weight.

(A) Equilibration product of trimethylsiloxy, dimethylsiloxy and hydridomethylsiloxy units having 0.047% by weight of Si-bonded hydrogen, based on the total weight of (A), and a viscosity of 110 mm$^2$/s, (B) alkenylsiloxane (B3), the preparation of which is described above under (I), (C) equilibration product of trimethylsiloxy and hydridomethylsiloxy units having a viscosity of 21 mm$^2$/s, (D) the platinum catalyst described above under (II) and (E) 1-ethynylcyclohexanol are mixed in succession and in the amount shown in Table 2 and the mixture is applied by doctor blade coating to low-absorbent glassine paper using a glass rod. Subsequent curing is carried out in a circulating air oven at an air temperature of 100° C.

TABLE 2

| Component | Recipe 1 | Recipe 2 | Comparison Recipe V1 |
| --- | --- | --- | --- |
| (A) | 53.1 g | 85.1 g | 106.4 g |
| (C) | 1.7 g | 0.7 g | — |
| (E) | 170 mg | 240 mg | 209 mg |
| (B) | 15.8 g | 15.8 g | 15.8 g |
| (D) | 0.7 g | 1.0 g | 1.2 g |

The molar ratio of hexenyl groups from (B) to the total amount of Si-bonded hydrogen from (A)+(C) in recipes 1 and 2 is in each case 1.2.

Recipes 1 and 2 and comparison recipe V1 each comprise 0.24% by weight of (E) and 100 ppm of Pt, based on the total weight of the individual recipe.

Data on the vulcanization and film properties of the resulting coatings are to be found in Table 3.

TABLE 3

| Recipe | Curing | Surface | Rub Off | Pot Life |
|---|---|---|---|---|
| 1 | 5 minutes at 100° C. | non-tacky | none | >4 days |
| 2 | 5 minutes at 100° C. | non-tacky | none | >4 days |
| V1 | 5 minutes at 100° C. | non-tacky | severe | >4 days |

Comparison example V1 shows that without addition of component (C), no adequate anchoring of the film to the coated surface is achieved, although a very long vulcanization has been chosen.

EXAMPLE 2

(A) Equilibration product of hydridodimethylsiloxy and dimethylsiloxy units having 0.02% by weight of Si-bonded hydrogen, based on the total weight of (A), and a viscosity of 240 mm²/s, (B) alkenylsiloxane (B2), the preparation of which is described in Example 1 under (I), (C) equilibration product of trimethylsiloxy and hydridomethylsiloxy units having a viscosity of 21 mm²/s, (D) the platinum catalyst described in Example 1 under (II) and (E) 1-ethynylcyclohexanol are mixed in succession and in the amount shown in Table 4 and the mixture is applied by doctor blade coating to a low-absorbent glassine paper using a glass rod. Subsequent curing is carried out in a circulating air oven at an air temperature of 150° C.

TABLE 4

| Component | Recipe 3 | Comparison Recipe V2 |
|---|---|---|
| (A) | 188 g | 250 g |
| (C) | 0.8 g | — |
| (E) | 200 mg | 260 mg |
| (B) | 14 g | 14 g |
| (D) | 2.0 g | 2.6 g |

Recipe 3 and comparison recipe V2 each comprise 0.10% by weight of (E), based on the total weight of the individual recipe.

Data on the vulcanization and film properties of the resulting coatings are to be found in Table 5.

TABLE 5

| Recipe | Curing | Surface | Rub Off | Pot Life |
|---|---|---|---|---|
| 3 | 2 seconds at 150° C. | non-tacky | none | >24 hours |
| 3 | 1 second at 150° C. | non-tacky | none | >24 hours |
| 3¹ | 2 seconds at 150° C. | non-tacky | none | >24 hours |
| V2 | 2 seconds at 150° C. | non-tacky | severe | >24 hours |

¹Recipe 3 after storage for four hours.

Comparison example V2 shows that no adequate anchoring of the film to the coated surface is achieved without addition of component (C).

EXAMPLE 3

(III) Platinum catalyst 1,3-Divinyl-1,1,3,3-tetramethyldisiloxane complex of platinum according to U.S. 3,775,452, diluted in α, -divinyldimethylsilicone dimethylsilicone oil, at viscosity 1000 mm²/s, to a Pt content of 27.0% by weight.

Using the components (A), (B), (C) and (E) described in Example 2 and the platinum catalyst characterized above under (III) as components (D'), the mixture R and mixture S are prepared, having the proportion of the individual components indicated respectively in Table 6.

TABLE 6

| Component | Mixture R | Mixture S |
|---|---|---|
| (A) | 188.0g | — |
| (B) | — | 15.2 g |
| (C) | 0.8g | — |
| (D') | — | 75 mg |
| (E) | 0.2g | — |

A ready-to-use formulation can be prepared by stirring one part by weight of mixture S into 12.3 parts by weight of mixture R.

Formulation a: Mixtures R and S are combined immediately after their preparation.

Formulation b: Mixtures R and S are first stored at 70° C. for a period of 170 hours and then combined.

Formulation c: Formulation (a) after storage at 25° C. for 4 hours.

The individual formulations a–c are each applied by doctor blade coating to a low-absorbent glassine paper using a glass rod. Subsequent curing is carried out in a circulating-air oven at an air temperature of 150° C.

Information of the vulcanization and film properties of the resulting coatings can be found in Table 7.

TABLE 7

| Recipe | Curing | Surface | Rub Off |
|---|---|---|---|
| a | 1 second at 150° C. | non-tacky | none |
| b | 1 second at 150° C. | non-tacky | none |
| c | 1 second at 150° C. | non-tacky | none |

What is claimed is:

1. A composition which comprises (A) a polymeric organosilicon compound having, 1 to 6 Si-bonded hydrogen atoms per molecule present in a proportion of 0.001% to 0.100% by weight, based on the total weight of the organosilicon compound (A), (B) a polymeric organosilicon compound having at least three groups $R^2$ per molecule of the formula

$$-R-(CH=CH_2)_{x-1}$$

where R is a divalent, trivalent or tetravalent hydrocarbon radical having 1 to 12 carbon atoms, optionally interrupted by 1 to 4 oxygen atoms, and x is, according to the meaning of the radical R, 2, 3 or 4, the viscosity of the organosilicon compound (B) at 25° C. being not more than 200 mm²/s, (C) a polymeric organosilicon compound having on average at least 10 Si-bonded hydrogen atoms per molecule present in a proportion of 0.4% to 1.7% by weight, based on the total weight of the organosilicon compound (C), (D) a catalyst which promotes the addition of Si-bonded hydrogen onto an aliphatic double bond and, optionally, (E) an inhibitor, with the proviso that the molar ratio of all the Si-bonded hydrogen atoms to all the alkenyl groups —CH=CH₂ in the composition is on average less than 1, the composition comprises an organosilicon compound (B) in an amount such that the composition contains, per Si-bonded hydrogen atom of component (A), on average at least 1.1, alkenyl radicals —CH=CH$_2$ of component (B)

and the content of Si-bonded hydrogen atoms of the organosilicon compound (C) is 5% to 50%, based on the number of all the Si-bonded hydrogen atoms present in the composition.

2. A composition as claimed in claim 1, wherein the organosilicon compound (A) is comprised of units of the formula $$H_e R^1_f SiO_{\frac{4-e-f}{2}}, \qquad (I)$$

in which

R$^1$ is independently, SiC-bonded, optionally halogenated hydrocarbon radicals having 1 to 18 carbon atoms, e is 0 or 1, on average 0.001 to 0.1, f is 0, 1, 2 or 3, on average 1.0 to 2.0, and the sum of e+f is not greater than 3, with the proviso that the organosilicon compound (A) contains from 1 to 6 Si-bonded hydrogen atoms which are present in a proportion of 0,001% to 0.100% by weight, based on the total weight of the organosilicon compound (A).

3. A composition as claimed in claim 1, wherein the organosilicon compound (A) is an organopolysiloxane of the formula $$H_d R^2_{3-d} SiO(SiR^1_2 O)_o (SiHR^1 O)_p SiR^1_{2-d} H_d \qquad (II),$$

in which

R$^1$ is independently, SiC-bonded optionally halogenated hydrocarbon radicals having 1 to 18 carbon atoms, d is 0 or 1, o is an integer from 10 to 1000 and p is 0 or an integer from 1 to 6, with the proviso that the organosilicon compound (A) contains 1 to 6 Si-bonded hydrogen atoms per molecule which are present in a proportion of 0.001% to 0.100% by weight, based on the total weight of the organosilicon compound (A).

4. A composition as claimed in claim 1, wherein the organosilicon compound (B) contains at least 3 alkenyl groups —CH=CH$_2$.

5. A composition as claimed in claim 1, wherein the content of groups R$^2$ of the formula —R—(CH=CH$_2$)$_{x-1}$, where R and X are defined as in claim 1, in the organosilicon compound (B) is more than 10%, based on the number of all SiC-bonded radicals.

6. A composition as claimed in claim 1, wherein component (B) is present in an amount of 1 to 25 parts by weight per 100 parts by weight of organosilicon compound (A) employed.

7. A composition as claimed in claim 1, wherein the organosilicon compound (C) has the formula $$H_g R^4_h SiO_{\frac{4-g-h}{2}}, \qquad (V)$$

in which

R$^4$ is independently SiC-bonded, optionally halogenated hydrocarbon radicals having 1 to 18 carbon atoms, g is 0 or 1, on average 0.2 to 1.0, h is 0, 1, 2 or 3, on average 1.0 to 1.8, and the sum g+h is not greater than 3, with the proviso that the organosilicon compound (C) contains at least 10 Si-bonded hydrogen atoms which are present in a proportion of 0.4% to 1.7% by weight, based on the total weight of the organosilicon compound (C).

8. A composition as claimed in claim 1, wherein the organosilicon compound (D) is an organopolysiloxane of the formula $$H_l R^4_{3-l} SiO(SiR^4_2 O)_k (SiHR^4_{3-i} H_i \qquad (VI),$$

in which R$^4$ is independently SiC-bonded, optionally halogenated hydrocarbon radicals having 1 to 18 carbon atoms, l is 0 or 1, k is 0 or an integer from 1 to 50 and l is an integer from 10 to 60, the sum of k+l being not greater than 70.

9. A composition as claimed in claim 1, wherein the inhibitor (E) is an inhibitor which delays addition of Si-bonded hydrogen at an aliphatic double bond at room temperature.

10. A non-stick coating comprising the composition as claimed in claim 1.

* * * * *